United States Patent
Du

(10) Patent No.: US 11,200,335 B2
(45) Date of Patent: Dec. 14, 2021

(54) SECURE IN-MEMORY DATABASE IN CONTAINER

(71) Applicant: SAP SE, Walldorf (DE)

(72) Inventor: Long Du, Xi'an (CN)

(73) Assignee: SAP SE, Walldorf (DE)

( * ) Notice: Subject to any disclaimer, the term of this patent is extended or adjusted under 35 U.S.C. 154(b) by 98 days.

(21) Appl. No.: 16/810,646

(22) Filed: Mar. 5, 2020

(65) Prior Publication Data
US 2021/0279353 A1 Sep. 9, 2021

(51) Int. Cl.
| | | |
|---|---|---|
| *G06F 21/62* | (2013.01) | |
| *G06F 21/12* | (2013.01) | |
| *G06F 21/60* | (2013.01) | |
| *G06F 16/17* | (2019.01) | |
| *G06F 12/14* | (2006.01) | |

(52) U.S. Cl.
CPC ...... *G06F 21/6218* (2013.01); *G06F 12/1425* (2013.01); *G06F 16/1734* (2019.01); *G06F 21/121* (2013.01); *G06F 21/604* (2013.01); *G06F 21/62* (2013.01); *G06F 21/6281* (2013.01)

(58) Field of Classification Search
CPC ...... G06F 21/62; G06F 21/6218; G06F 21/12; G06F 21/121; G06F 21/60; G06F 21/604; G06F 21/6281; G06F 16/1734; G06F 12/1425
See application file for complete search history.

(56) References Cited

U.S. PATENT DOCUMENTS

| | | | | |
|---|---|---|---|---|
| 7,653,651 B1* | 1/2010 | Pavlov | ............... | G06F 16/2343 |
| | | | | 707/999.103 |
| 10,997,559 B1* | 5/2021 | Hoehnen | ............... | G06F 16/242 |
| 2017/0323112 A1* | 11/2017 | Tran | ..................... | G06F 16/258 |
| 2020/0117825 A1* | 4/2020 | Vaswani | ............... | H04L 9/0897 |

OTHER PUBLICATIONS

F. Pagano and D. Pagano, "Using in-memory encrypted databases on the cloud," 2011 1st International Workshop on Securing Services on the Cloud (IWSSC), 2011, pp. 30-37, doi: 10.1109/IWSSCloud.2011.6049022 (IEEE) (Year: 2011).*

* cited by examiner

*Primary Examiner* — Jayesh M Jhaveri
(74) *Attorney, Agent, or Firm* — Schwegman Lundberg & Woessner, P.A.

(57) ABSTRACT

In an example embodiment, a hardware mechanism for protecting user-level software from privileged system software is leveraged to protect in-memory databases in container implementations in a cloud. This hardware mechanism takes the form of an enclave. An enclave is a portion of a CPU that shields application code and data from accesses by other software, including higher-privileged software. Memory pages belonging to an enclave reside in the enclave page cache (EPC), which cannot be accessed by code outside of the enclave. This helps ensure that (1) applications built on top of in-memory database are securely trusted, (2) and a trusted path architecture is provided for enclaves allowing in-memory databases to run securely on top of untrusted cloud platform.

20 Claims, 7 Drawing Sheets

SECURE IN-MEMORY DATABASE IN CONTAINER

TECHNICAL FIELD

This document generally relates to in-memory database administration. More specifically, this document relates to a secure in-memory database in a container with hardware protection.

BACKGROUND

An in-memory database (also known as an in-memory database management system) is a type of database management system that primarily relies on main memory for computer data storage. It is contrasted with database management systems that employ a disk storage mechanism. In-memory databases are traditionally faster than disk storage databases because disk access is slower than memory access. One example in-memory database is the HANA® database from SAP SE, of Frankfurt Germany.

Software-as-a-Service (SaaS) is typically built on a cloud platform with all of the workloads running inside virtual machines (VMs). Container-based technologies such as Docker, LXD, and Rocket provide lightweight and low-resource-consuming architectures that make it possible to build a cloud platform in an infrastructure level. This contrasts with other types of virtualization systems that are heavy-weight and resource-consuming for enterprise infrastructure optimization and automation.

Considering the container technology's efficiency, ease of use, performance with VM applications, and the strong needs from a cloud platform, it would be beneficial to build a container cloud platform for an in-memory database such as HANA®, and more specifically to implement HANA® operated as a SaaS, such as HANA®-as-a-Service (HaaS).

BRIEF DESCRIPTION OF DRAWINGS

The present disclosure is illustrated by way of example and not limitation in the figures of the accompanying drawings, in which like references indicate similar elements.

DETAILED DESCRIPTION

Figure 1:
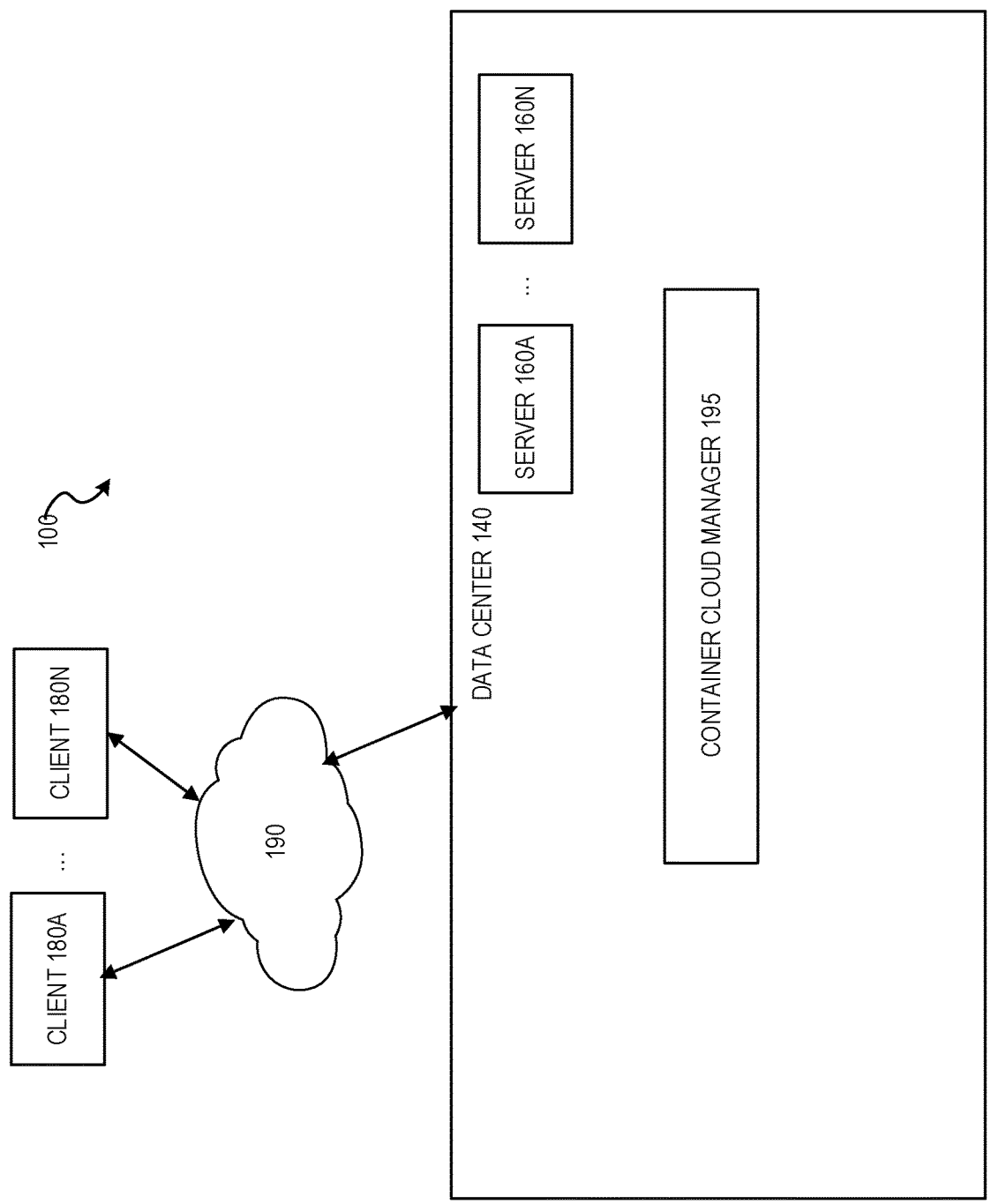
FIG. 1 is a block diagram of a system in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

When adopting container technology for in-memory database services, existing container isolation mechanisms focus on protecting the environment from accesses by untrusted containers. Tenants, however, want to protect the confidentiality and integrity of their application data from accesses by unauthorized parties—not only from other containers but also from higher-privileged software, such as the OS kernel and the hypervisor. Attackers may target vulnerabilities in existing virtualized system software, or compromise the credentials of privileged system administrators. The weaker isolation guarantees, enforced through kernel mechanisms, in container technologies thus make it easier for attackers to compromise the confidentiality and integrity of application data with containers.

What is needed is a solution that solves these technical problems.

In an example embodiment, a hardware mechanism for protecting user-level software from privileged system software is leveraged to protect in-memory databases in container implementations in a cloud. This hardware mechanism may take the form of an enclave. An enclave is a portion of a CPU that shields application code and data from accesses by other software, including higher-privileged software. Memory pages belonging to an enclave reside in the enclave page cache (EPC), which cannot be accessed by code outside of the enclave. One such enclave is provided by Software Guard Extensions (SGX) from Intel Corp. of Santa Clara, Calif.

The design of a secured in-memory database in a container mechanism using enclaves raises two technical challenges: (1) maintaining a low performance overhead of secure containers with the restrictions of the enclave systems; and (2) current enclave-capable CPUs restrict the maximum memory footprint of all enclaves to 128 MB, and in-memory databases have a much larger footprint. With the latter problem, one solution would be to use an enclave-specific form of in-memory paging between trusted and untrusted memory, but this requires costly re-encryption of enclave pages with a substantial performance overhead.

As such, rather than attempt to store an in-memory database as a whole in an enclave, in an example embodiment, an enclave inside a container is used to store application code, application-specific libraries and shim programming language (such as C) libraries. The in-memory database is stored in a separate container outside of an enclave. The enclave that shares a container with the in-memory database may store sensitive data.

HaaS is an in-memory database-based container cloud service. In an example embodiment, an application built upon HaaS is containerized and divided into multiple function units. Each component and its relevant functionality are developed and exposed to services outside the container via configurations, but this exposure brings vulnerabilities with it.

Enclave technology, such as SGX, allows applications to ensure confidentiality and integrity, even if the OS, hypervisor, or BIO are compromised. They also protect against attackers with physical access, assuming the CPU package itself is not breached.

Enclaves are trusted execution environments provided by SGX to applications. Enclave code and data reside in a region of protected physical memory called the enclave page cache (EPC). Cache-resident enclave code and data are guarded by CPU access controls. When moved to Dynamic Random-Access Memory (DRAM) or other system memory, data in EPC pages is protected at the granularity of cache lines. An on-chip memory encryption engine (MEE) encrypts and decrypts cache lines in the EPC written to and fetched from DRAM. Enclave memory is also integrity protected, meaning that memory modifications and rollbacks are detected.

Non-enclave code cannot access enclave memory, but enclave code can access untrusted DRAM outside the EPC directly, such as to pass function call parameters and results. It is the responsibility of the enclave code to verify the integrity of all untrusted data.

Enclaves are created by untrusted code using, for example, an ECREAT instruction, which initializes an SGX enclave control structure (SECS) in the EPC. The EADD instruction adds pages to the enclave. SGX records the enclave to which the page was added, its virtual address, and its permissions. It subsequently enforces security restrictions, such as ensuring the enclave maps the page at the accessed virtual address. When all enclave pages are loaded, an EINIT instruction creates a cryptographic measurement, which can be used by the remove parties for attestation.

In an example embodiment, the EPC-side size is between 64 MB and 128 MB. To support enclave applications with more memory, in an example embodiment a paging mechanism for swapping pages between the EPC and untrusted DRAM is supported. The system software uses privileged instructions to cause the hardware to copy a page into an encrypted buffer in DRAM outside of the EPC. Before reusing the freed EPC page, the system software follows a hardware-enforced protocol to flush Translation Lookaside Buffer (TLB) entries.

After enclave initialization, an unprivileged application can execute enclave code through an EENTER instruction, which switches the CPU to enclave mode and jumps to a predefined enclave offset. Conversely, the EEXIT instruction causes a thread to leave the enclave. SGX supports multi-threaded execution inside enclaves, with each thread's enclave execution state stored in a thread control structure (TCS).

In an example embodiment, secure containers are offered on top of an untrusted cloud environment by protecting sensitive data generated from an in-memory database and building trusted applications on top of an in-memory database. On a cloud environment, it is able to build security container images with the help of, for example, Docker, in a trusted environment and run secure containers in an untrusted environment.

In an example embodiment, the unmodified processes are executed inside security Docker containers by having the container support a C standard library (libc) interface. A secure container exposes an external interface to the hosting environment, as some libc implementations will invoke system calls that cannot be executed inside of an enclave.

FIG. 1 is a block diagram of a system 100 in accordance with an example embodiment. The system 100 may have a distributed architecture. In one implementation, the system 100 includes a data center 140. The data center 140 provides various services to users. The data center 140 and services form a cloud platform. The cloud platform, for example, may be Cloud Foundry. Other types of cloud platforms may also be useful.

The data center 140 includes numerous interconnected servers 160A-160N. For example, the servers 160A-160N are connected through a communication network. The communication network may be the Internet, an intranet, a local area network (LAN), a wide area network (WAN) or a combination thereof. Other types of connections may also be useful.

A plurality of clients, such as clients 180A-180N, may access the data center through a communication network 190. The communication network 190 may be the Internet or a WiFi communication network. Other types of communication networks, such as an intranet or a combination of different types of communication networks, may also be useful. Other techniques for communicating with the data center 140 by the clients 180A-180N may also be useful. Access to the data center 140 may require a user account and password. Other types of security measures may also be implemented.

A client 180A-180N may be a local or remote computing device with, for example, a local memory and a processor. The memory may include fixed and/or removable non-transitory computer-readable media, such as a magnetic computer disk, CD-ROM, or other suitable media. Various types of processing devices may serve as a client 180A-180N. For example, the client 180A-180N may be a PC, a tablet PC, a workstation, a network computer, a kiosk or a mobile computing device, such as a laptop, a tablet or a smart phone. Other types of processing devices may also be used. The client 180A-180N can receive, transmit, process and store any appropriate data associated with the architecture.

Clients 180A-180N may access the data center 140 for various reasons. In one embodiment, clients 180A-180N may include developer clients and user clients. For example, developer clients develop applications (apps) for the data center 140. In one embodiment, the developer clients may be developing apps for a cloud platform or cloud foundry. As for user clients, they access the data center 140 to utilize various available apps. Other types of clients may also be included. For example, a front-end portion of an app, which is selected for installation, is loaded onto the client device. When invoked by the user, the back-end portion of the app runs in the data center 140, based on instructions by the user client. The results are presented to the user on the user device.

As for the data center 140, a server 160A-160N may be a computer which includes a memory and a processor. Various types of computers may be employed for the server 160A-N. For example, the computer may be a mainframe, a workstation, as well as other types of processing devices. The memory of a computer may include any memory or database module. The memory may be volatile or non-volatile types of non-transitory computer-readable media, such as magnetic media, optical media, random access memory (RAM), read-only memory (ROM), removable media, or any other suitable local or remote memory component. A server 160A-160N, for example, is a host in the data center 140 and does not include a display device. Other types and configurations of servers may also be useful.

As shown, the data center 140 includes a container cloud manager 195 module. The container cloud manager 195 manages the resources of the data center 140, which includes the servers 160A-160N. The container cloud manager 195 serves the role of a manager while servers 160A-160N serve the role of workers. Other configurations of container cloud manager 195 and servers may also be useful.

In one embodiment, the container cloud manager 195 includes a storage master and a master database. In one embodiment, the master database may be a SAP HANA database from SAP SE, of Frankfurt, Germany. For example, the master database may include a HANA XE Engine. Other types of databases may also be useful. In one embodiment, the container cloud manager 195 includes multiple copies or replications. For example, the container cloud manager 195 may include an original (master) and second and third replications. Providing other numbers of copies may also be useful. In one embodiment, the cloud manager involves HANA System Replication (HANA SR). In one embodiment, the container cloud manager 195 is embedded with an application-level container framework. For example, the container cloud manager 195 and its replications may work as a container framework. In one embodiment, the container framework is a Docker framework. Other types of container frameworks may also be useful. For example, container frameworks such as LXC or Rocket container frameworks may also be useful. Docker, for example, is embedded with the master database. This enables management of containers and cloud application (app) images of the data center 140. The container cloud manager 195, in one embodiment, employs a container service, such as a Docker service, to manage containers and app images of the data center.

Figure 2:
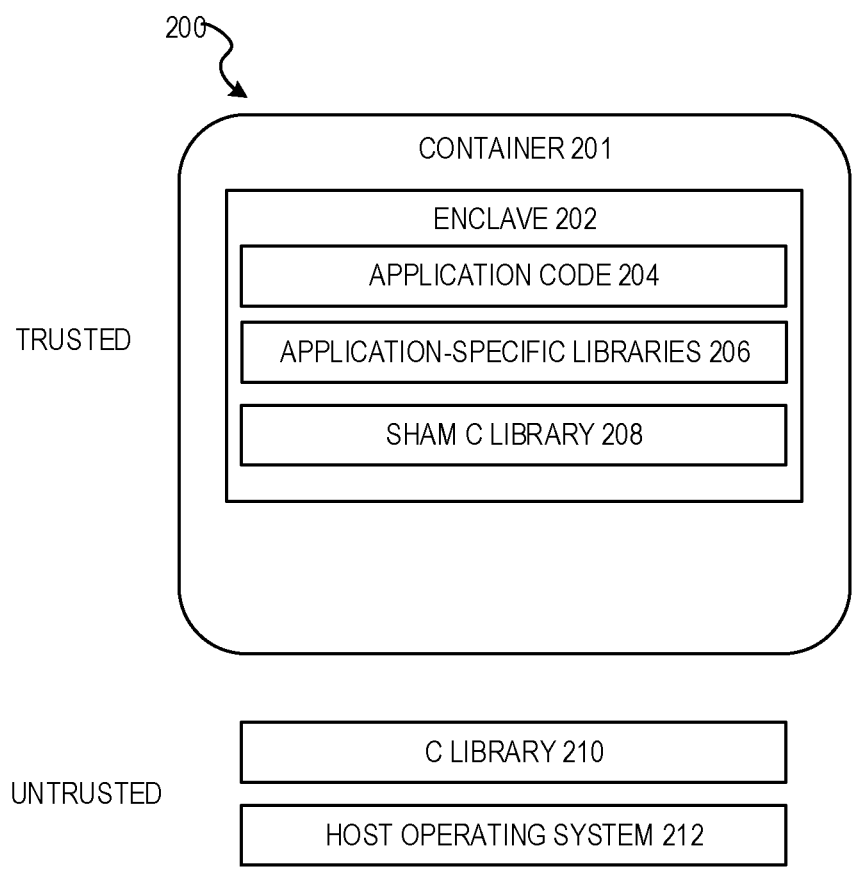
FIG. 2 is a block diagram illustrating a secure container mechanism in accordance with an example embodiment.

FIG. 2 is a block diagram illustrating a secure container mechanism 200 in accordance with an example embodiment. Here, a container 201 is provided with an enclave 202. The enclave 202 stores application code 204, application-specific libraries 206, and a shim C library 208. The shim C library 208 relays libc library calls to a C library 210 located outside of the enclave 202. The host operating system 212 is also located outside of the enclave 202. The result is that the C library 210 and host operating system 212 are located in untrusted portions of the system while the application code 204, application-specific libraries 206, and the shim C library 208 are located in trusted portions of the system.

In an example embodiment, a threaded pool model is supported in which multiple application threads inside the enclave 202 are mapped to several operating system threads. This requires fewer enclave transitions.

In an example embodiment, an asynchronous system call interface is utilized, where all requests are registered to an interface and all responses call back the registered request to return information. This is because, for example, SGX does not allow system calls to be issued within an enclave 202, and thus they are implemented with the help of calls to functions outside the enclave 202.

Figure 3:
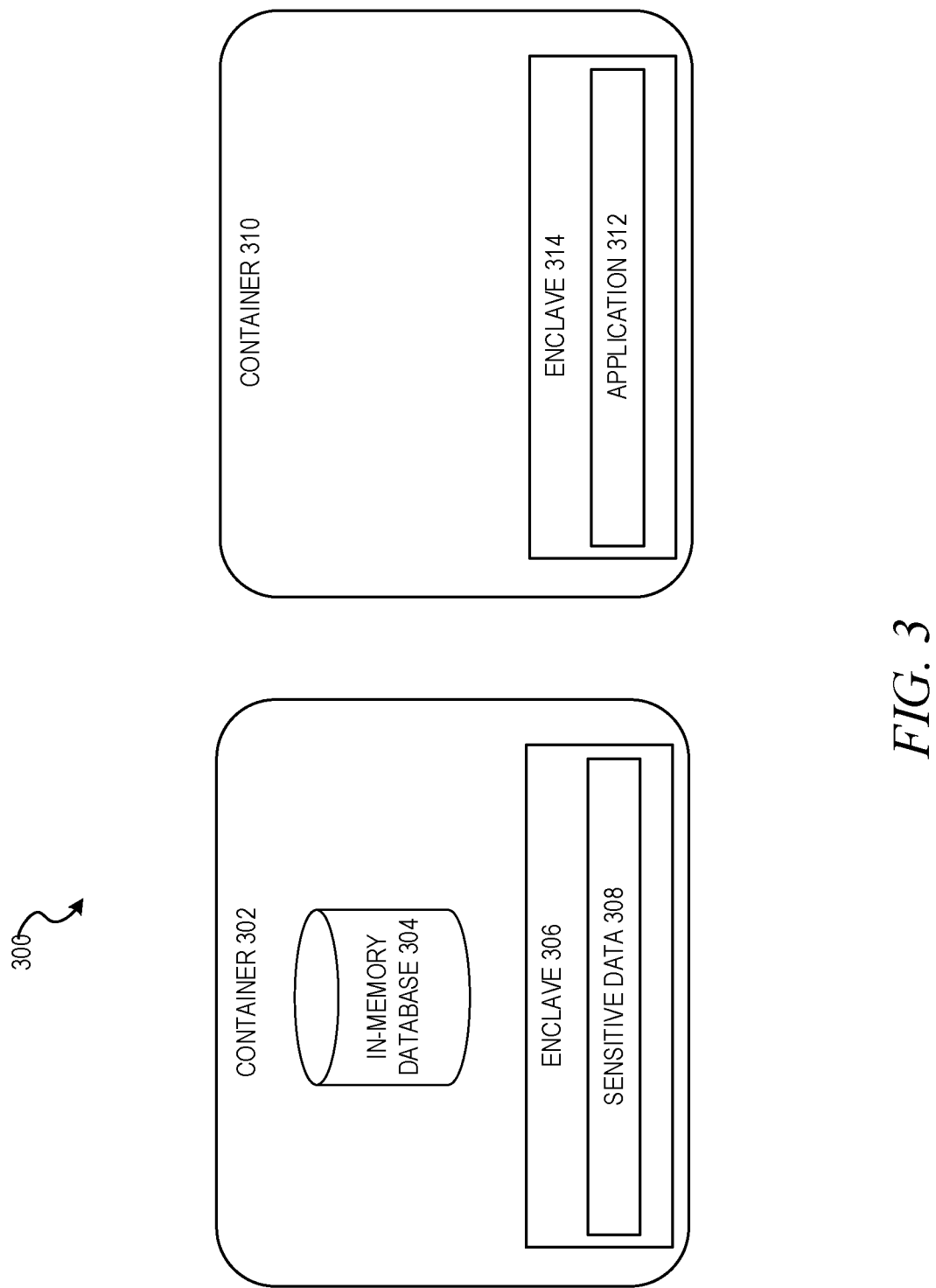
FIG. 3 is a block diagram illustrating a secure container service for an in-memory database in accordance with an example embodiment.

FIG. 3 is a block diagram illustrating a secured container service 300 for an in-memory database in accordance with an example embodiment. Here, a container 302 for an in-memory database 304 stores the in-memory database 304 itself outside of an enclave 306, but sensitive data 308 from the in-memory database 304 is stored inside the enclave 306. This sensitive data 308 may include, for example, generated data from the in-memory database 304 such as logs. A container 310 for an application 312 may store the application itself 312, including the aforementioned application code 204, application-specific libraries 206, and a sham C library 208 from FIG. 2, in an enclave 314. It should be noted that while enclave 306 and enclave 314 are depicted as separate enclaves, in some example embodiments they may be the same enclave shared between the containers 302, 310.

Figure 4:
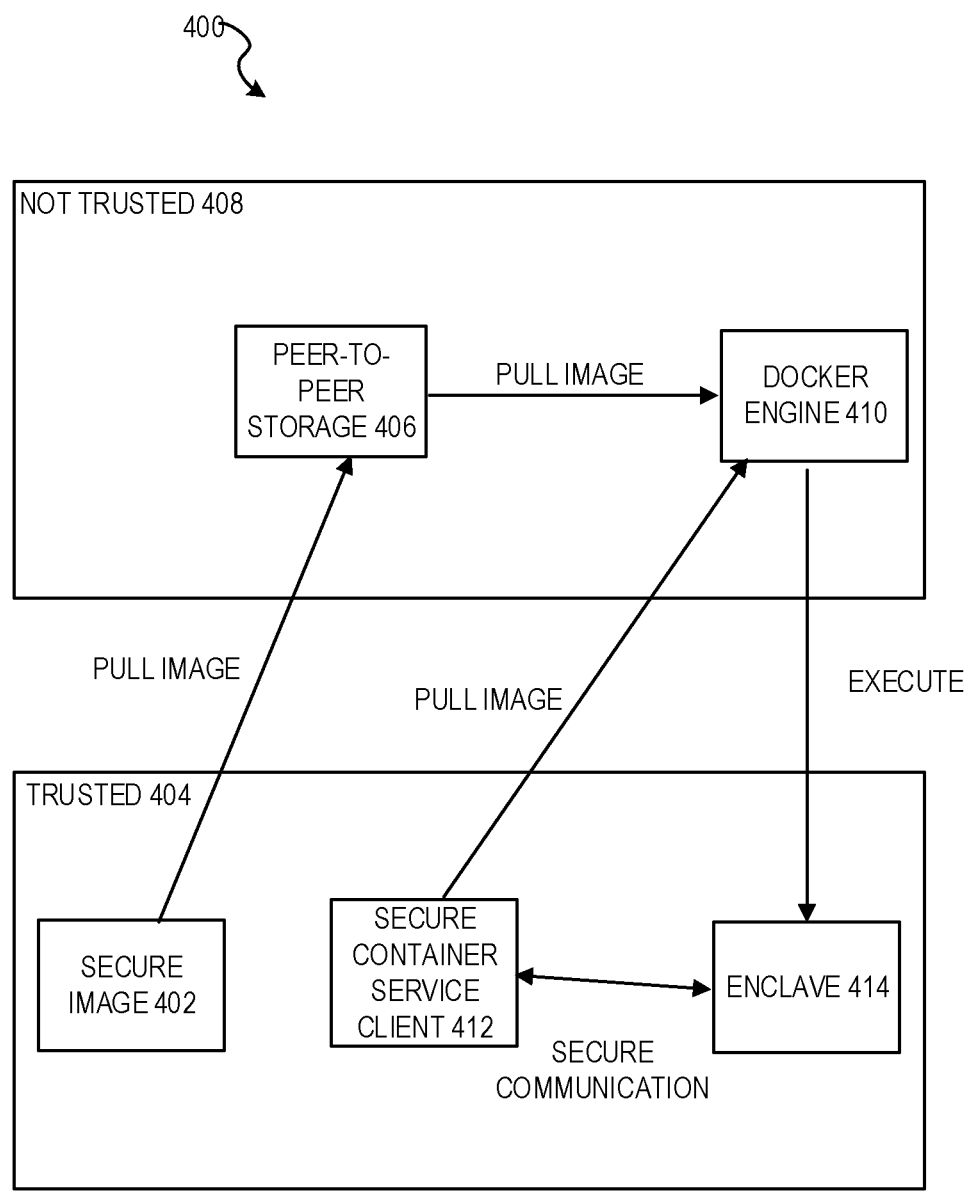
FIG. 4 is a flow diagram illustrating a build process of secure images, in accordance with an example embodiment.

A kernel module for the secured container service 300 (along with an enclave driver, such as an SGX driver) may be installed on a hosting environment to control the components installed inside each container. The kernel module also necessitates changes to the build process of secure images. FIG. 4 is a flow diagram illustrating a build process 400 of secure images, in accordance with an example embodiment. Here, a secure image 402, stored in a trusted location 404, is pulled by a peer-to-peer storage 406, located in an untrusted location 408. The peer-to-peer storage 406 stores the secure image 402 in the untrusted location 408. Later, a Docker engine 410 pulls the secure image 402 from the peer-to-peer storage 406, and also pulls one or more images from a secure container service client 412 located at the trusted location 404. Execution of commands by the docker engine 410 can be made to the enclave 414, located at the trusted location 404, and secure communication between the secure container service client 412 and the enclave 414 can be made.

Figure 5:
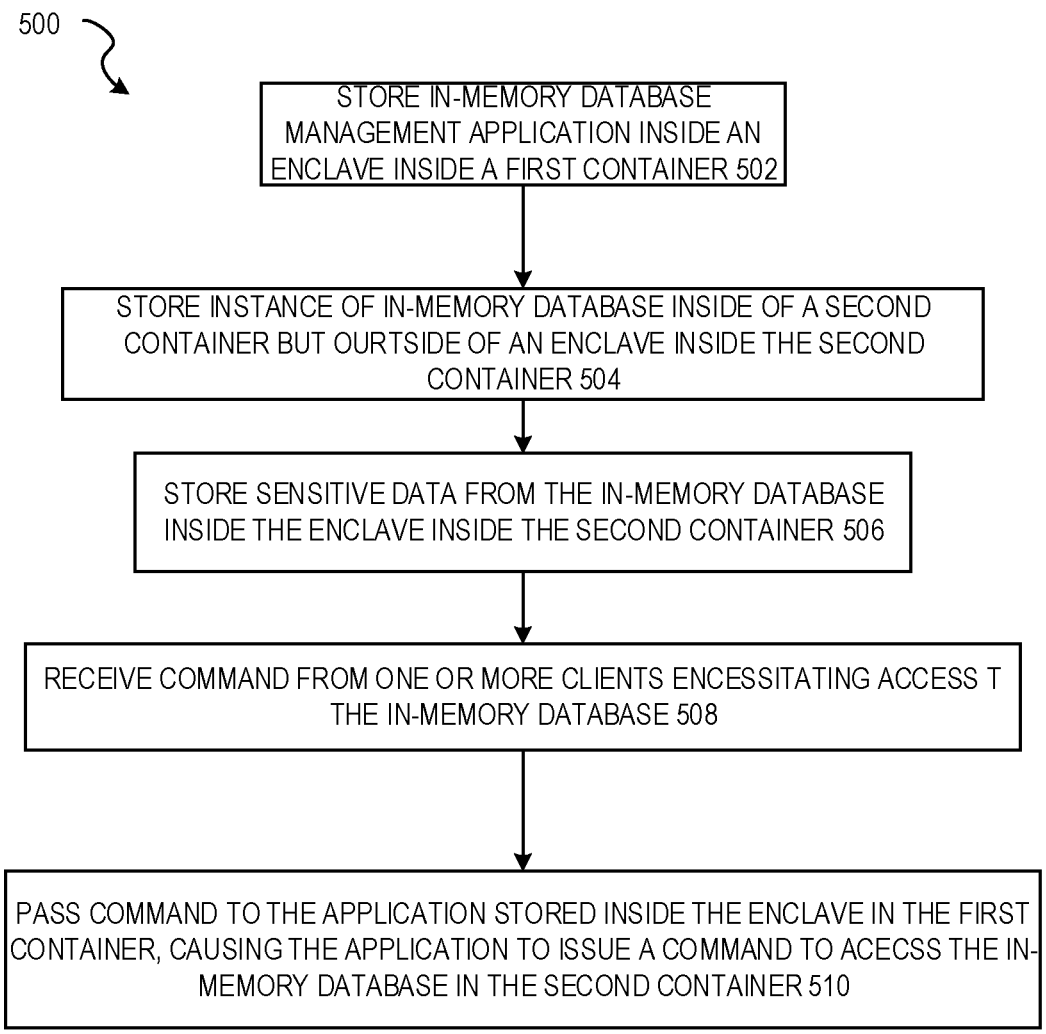
FIG. 5 is a flow diagram illustrating a method for providing a secure container for an in-memory database management system in accordance with an example embodiment.

FIG. 5 is a flow diagram illustrating a method 500 for providing a secure container for an in-memory database management system in accordance with an example embodiment. At operation 502, an in-memory database management application is stored inside of an enclave inside of a first container in a container-based cloud service. The enclave utilizes central processing unit (CPU)-specific software instructions to shield data from software outside the enclave.

At operation 504, an instance of an in-memory database is stored inside of a second container but outside of an enclave inside the second container. At operation 506, sensitive data from the in-memory database is stored inside the enclave inside the second container. At operation 508, a command is received from one or more clients necessitating access to the in-memory database. At operation 510, the command is passed to the application stored inside the enclave in the first container, causing the application to issue a command to access the in-memory database in the second container.

EXAMPLES

Example 1

A system comprising:
at least one hardware processor; and
a computer-readable medium storing instructions that, when executed by the at least one hardware processor, cause the at least one hardware processor to perform operations comprising:
storing an in-memory database management application inside of an enclave inside of a first container in a container-based cloud service, wherein the enclave utilizes central processing unit (CPU)-specific software instructions to shield data from software outside the enclave;
storing an instance of an in-memory database inside of a second container but outside of an enclave inside the second container;
storing sensitive data from the in-memory database inside the enclave inside the second container;
receiving, from one or more clients, a command necessitating access to the in-memory database; and
passing the command to the application stored inside the enclave in the first container, causing the application to issue a command to access the in-memory database in the second container.

Example 2

The system of Example 1, wherein the application includes application code, one or more application-specific libraries, and a shim library, the shim library including procedures to relay library calls to a host library stored in the first container but outside of the enclave inside the first container.

Example 3

The system of Examples 1 or 2, wherein the sensitive data includes data generated from data in the in-memory database.

Example 4

The system of Example 3, wherein the sensitive data includes access logs for the in-memory database.

Example 5

The system of any of Examples 1-4, wherein the enclave in the second container and the enclave in the first container are the same enclave.

Example 6

The system of any of Examples 1-5, wherein the first container and the second container support a library interface.

Example 7

The system of any of Examples 1-6, wherein enclave code and data reside in an enclave page cache, wherein the enclave page cache is a region of protected physical memory guarded by CPU access controls.

Example 8

A method comprising:
storing an in-memory database management application inside of an enclave inside of a first container in a container-based cloud service, wherein the enclave utilizes central processing unit (CPU)-specific software instructions to shield data from software outside the enclave;
storing an instance of an in-memory database inside of a second container but outside of an enclave inside the second container;
storing sensitive data from the in-memory database inside the enclave inside the second container;
receiving, from one or more clients, a command necessitating access to the in-memory database; and
passing the command to the application stored inside the enclave in the first container, causing the application to issue a command to access the in-memory database in the second container.

Example 9

The method of Example 8, wherein the application includes application code, one or more application-specific libraries, and a shim library, the shim library including procedures to relay library calls to a host library stored in the first container but outside of the enclave inside the first container.

Example 10

The method of Example 8 or 9, wherein the sensitive data includes data generated from data in the in-memory database.

Example 11

The method of Example 10, wherein the sensitive data includes access logs for the in-memory database.

Example 12

The method of any of Examples 8-11, wherein the enclave in the second container and the enclave in the first container are the same enclave.

Example 13

The method of any of Examples 8-12, wherein the first container and the second container support a library interface.

Example 14

The method of any of Examples 8-13, wherein enclave code and data reside in an enclave page cache, wherein the enclave page cache is a region of protected physical memory guarded by CPU access controls.

Example 15

A non-transitory machine-readable medium storing instructions which, when executed by one or more processors, cause the one or more processors to perform operations comprising:
storing an in-memory database management application inside of an enclave inside of a first container in a container-based cloud service, wherein the enclave utilizes central processing unit (CPU)-specific software instructions to shield data from software outside the enclave;
storing an instance of an in-memory database inside of a second container but outside of an enclave inside the second container;
storing sensitive data from the in-memory database inside the enclave inside the second container;
receiving, from one or more clients, a command necessitating access to the in-memory database; and
passing the command to the application stored inside the enclave in the first container, causing the application to issue a command to access the in-memory database in the second container.

Example 16

The non-transitory machine-readable medium of Example 15, wherein the application includes application code, one or more application-specific libraries, and a shim library, the shim library including procedures to relay library calls to a host library stored in the first container but outside of the enclave inside the first container.

Example 17

The non-transitory machine-readable medium of Example 15 or 16, wherein the sensitive data includes data generated from data in the in-memory database.

Example 18

The non-transitory machine-readable medium of Example 17, wherein the sensitive data includes access logs for the in-memory database.

Example 19

The non-transitory machine-readable medium of any of Examples 15-18, wherein the enclave in the second container and the enclave in the first container are the same enclave.

Example 20

The non-transitory machine-readable medium of any of Examples 15-19, wherein enclave code and data reside in an enclave page cache, wherein the enclave page cache is a region of protected physical memory guarded by CPU access controls.

Figure 6:
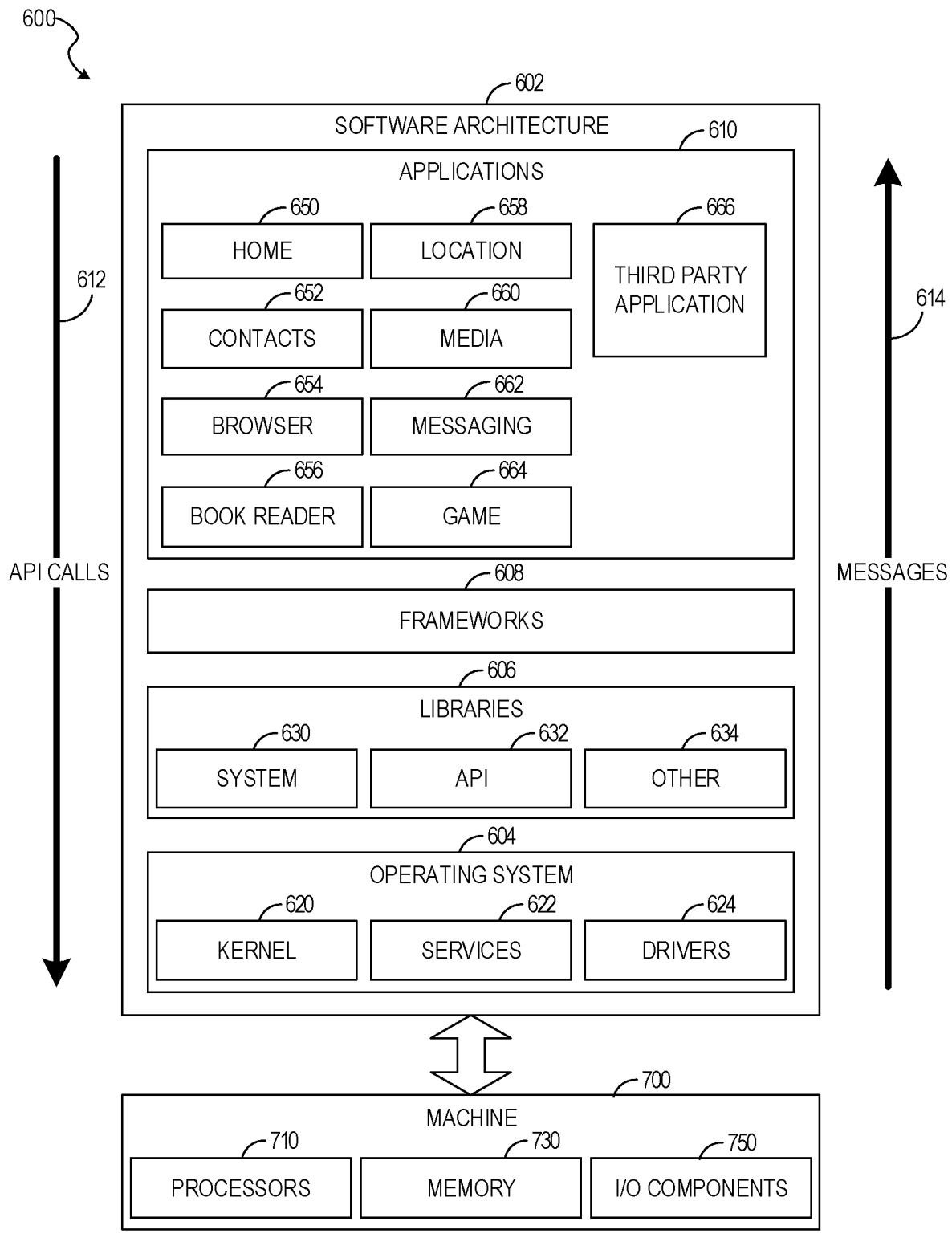
FIG. 6 is a block diagram illustrating an architecture of software, which can be installed on any one or more of the devices described above.

FIG. 6 is a block diagram 600 illustrating a software architecture 602, which can be installed on any one or more of the devices described above. FIG. 6 is merely a non-limiting example of a software architecture, and it will be appreciated that many other architectures can be implemented to facilitate the functionality described herein. In various embodiments, the software architecture 602 is implemented by hardware such as a machine 700 of FIG. 7 that includes processors 710, memory 730, and input/output (I/O) components 750. In this example architecture, the software architecture 602 can be conceptualized as a stack of layers where each layer may provide a particular functionality. For example, the software architecture 602 includes layers such as an operating system 604, libraries 606, frameworks 608, and applications 610. Operationally, the applications 610 invoke API calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware, according to some embodiments. For instance, the drivers 624 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610, according to some embodiments. For example, the frameworks 608 provide various graphical user interface (GUI) functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications, such as a third-party application 666. According to some embodiments, the applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third-party application 666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 666 can invoke the API calls 612 provided by the operating system 604 to facilitate functionality described herein.

Figure 7:
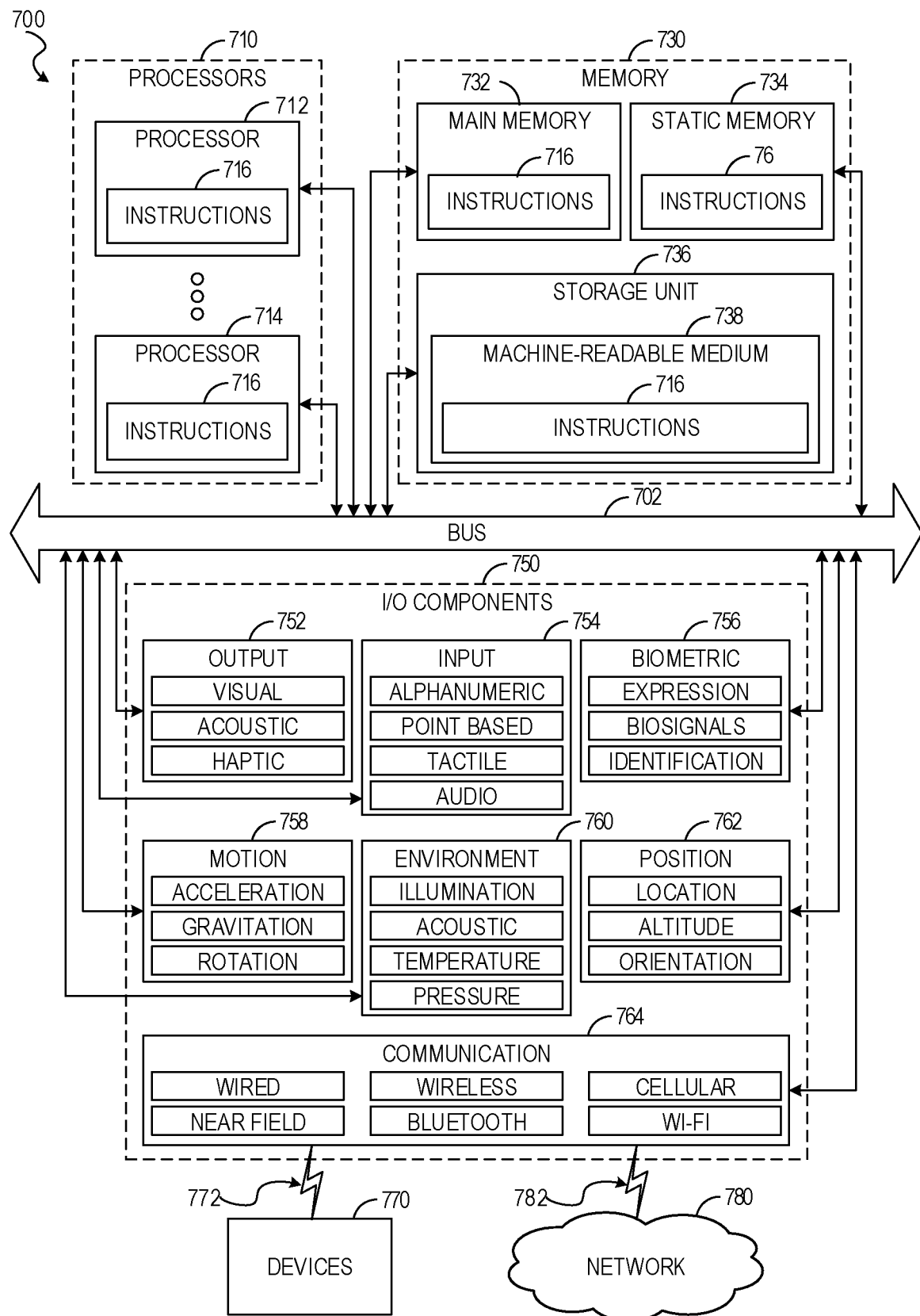
FIG. 7 illustrates a diagrammatic representation of a machine in the form of a computer system within which a set of instructions may be executed for causing the machine to perform any one or more of the methodologies discussed herein, according to an example embodiment.

FIG. 7 illustrates a diagrammatic representation of a machine 700 in the form of a computer system within which a set of instructions may be executed for causing the machine 700 to perform any one or more of the methodologies discussed herein, according to an example embodiment. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example, the instructions 716 may cause the machine 700 to execute the methods of FIG. 5. Additionally, or alternatively, the instructions 716 may implement FIGS. 1-5 and so forth. The instructions 716 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and I/O components 750, which may be configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors that may comprise two or more independent processors (sometimes referred to as "cores") that may execute instructions 716 contemporaneously. Although FIG. 7 shows multiple processors 710, the machine 700 may include a single processor 712 with a single core, a single processor 712 with multiple cores (e.g., a multi-core processor 712), multiple processors 712, 714 with a single core, multiple processors 712, 714 with multiple cores, or any combination thereof.

The memory 730 may include a main memory 732, a static memory 734, and a storage unit 736, each accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 may include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion, and the grouping is in no way limiting. In various example embodiments, the I/O components 750 may include output components 752 and input components 754. The output components 752 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762, among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 762 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., coupled via a USB).

Moreover, the communication components 764 may detect identifiers or include components operable to detect identifiers. For example, the communication components 764 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

The various memories (i.e., 730, 732, 734, and/or memory of the processor(s) 710) and/or the storage unit 736 may store one or more sets of instructions 716 and data structures (e.g., software) embodying or utilized by any one or more of the methodologies or functions described herein. These instructions (e.g., the instructions 716), when executed by the processor(s) 710, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 780 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., Hypertext Transfer Protocol (HTTP)). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising: at least one hardware processor; and
a computer-readable medium storing instructions that, when executed by the at least one hardware processor, cause the at least one hardware processor to perform operations comprising:
storing an in-memory database management application inside of an enclave inside of a first container in a container-based cloud service, wherein the enclave utilizes central processing unit (CPU)-specific software instructions to shield data from software outside the enclave;
storing an instance of an in-memory database inside of a second container but outside of an enclave inside the second container;
storing sensitive data from the in-memory database inside the enclave inside the second container;
receiving, from one or more clients, a command necessitating access to the in-memory database; and
passing the command to the in-memory database management application stored inside the enclave in the first container, causing the in-memory database management application to issue a command to access the in-memory database in the second container.

2. The system of claim 1, wherein the application includes application code, one or more application-specific libraries, and a sham library, the sham library including procedures to relay library calls to a host library stored in the first container but outside of the enclave inside the first container.

3. The system of claim 1, wherein the sensitive data includes data generated from data in the in-memory database.

4. The system of claim 3, wherein the sensitive data includes access logs for the in-memory database.

5. The system of claim 1, wherein the enclave in the second container and the enclave in the first container are the same enclave.

6. The system of claim 1, wherein the first container and the second container support a library interface.

7. The system of claim 1, wherein enclave code and data reside in an enclave page cache, wherein the enclave page cache is a region of protected physical memory guarded by CPU access controls.

8. A method comprising: storing an in-memory database management application inside of an enclave inside of a first container in a container-based cloud service, wherein the enclave utilizes central processing unit (CPU)-specific software instructions to shield data from software outside the enclave;
   storing an instance of an in-memory database inside of a second container but outside of an enclave inside the second container;
   storing sensitive data from the in-memory database inside the enclave inside the second container;
   receiving, from one or more clients, a command necessitating access to the in-memory database; and
   passing the command to the in-memory database management application stored inside the enclave in the first container, causing the in-memory database management application to issue a command to access the in-memory database in the second container.

9. The method of claim 8, wherein the application includes application code, one or more application-specific libraries, and a sham library, the sham library including procedures to relay library calls to a host library stored in the first container but outside of the enclave inside the first container.

10. The method of claim 8, wherein the sensitive data includes data generated from data in the in-memory database.

11. The method of claim 10, wherein the sensitive data includes access logs for the in-memory database.

12. The method of claim 8, wherein the enclave in the second container and the enclave in the first container are the same enclave.

13. The method of claim 8, wherein the first container and the second container support a library interface.

14. The method of claim 8, wherein enclave code and data reside in an enclave page cache, wherein the enclave page cache is a region of protected physical memory guarded by CPU access controls.

15. A non-transitory machine-readable medium storing instructions which, when executed by one or more processors, cause the one or more processors to perform operations comprising:
   storing an in-memory database management application inside of an enclave inside of a first container in a container-based cloud service, wherein the enclave utilizes central processing unit (CPU)-specific software instructions to shield data from software outside the enclave;
   storing an instance of an in-memory database inside of a second container but outside of an enclave inside the second container;
   storing sensitive data from the in-memory database inside the enclave inside the second container;
   receiving, from one or more clients, a command necessitating access to the in-memory database; and
   passing the command to the in-memory database management application stored inside the enclave in the first container, causing the in-memory database management application to issue a command to access the in-memory database in the second container.

16. The non-transitory machine-readable medium of claim 15, wherein the application includes application code, one or more application-specific libraries, and a sham library, the sham library including procedures to relay library calls to a host library stored in the first container but outside of the enclave inside the first container.

17. The non-transitory machine-readable medium of claim 15, wherein the sensitive data includes data generated from data in the in-memory database.

18. The non-transitory machine-readable medium of claim 17, wherein the sensitive data includes access logs for the in-memory database.

19. The non-transitory machine-readable medium of claim 15, wherein the enclave in the second container and the enclave in the first container are the same enclave.

20. The non-transitory machine-readable medium of claim 15, wherein enclave code and data reside in an enclave page cache, wherein the enclave page cache is a region of protected physical memory guarded by CPU access controls.

* * * * *